Nov. 11, 1941.  W. SCHAAKE  2,262,374
CURRENT COLLECTOR
Filed Jan. 4, 1939   2 Sheets-Sheet 2
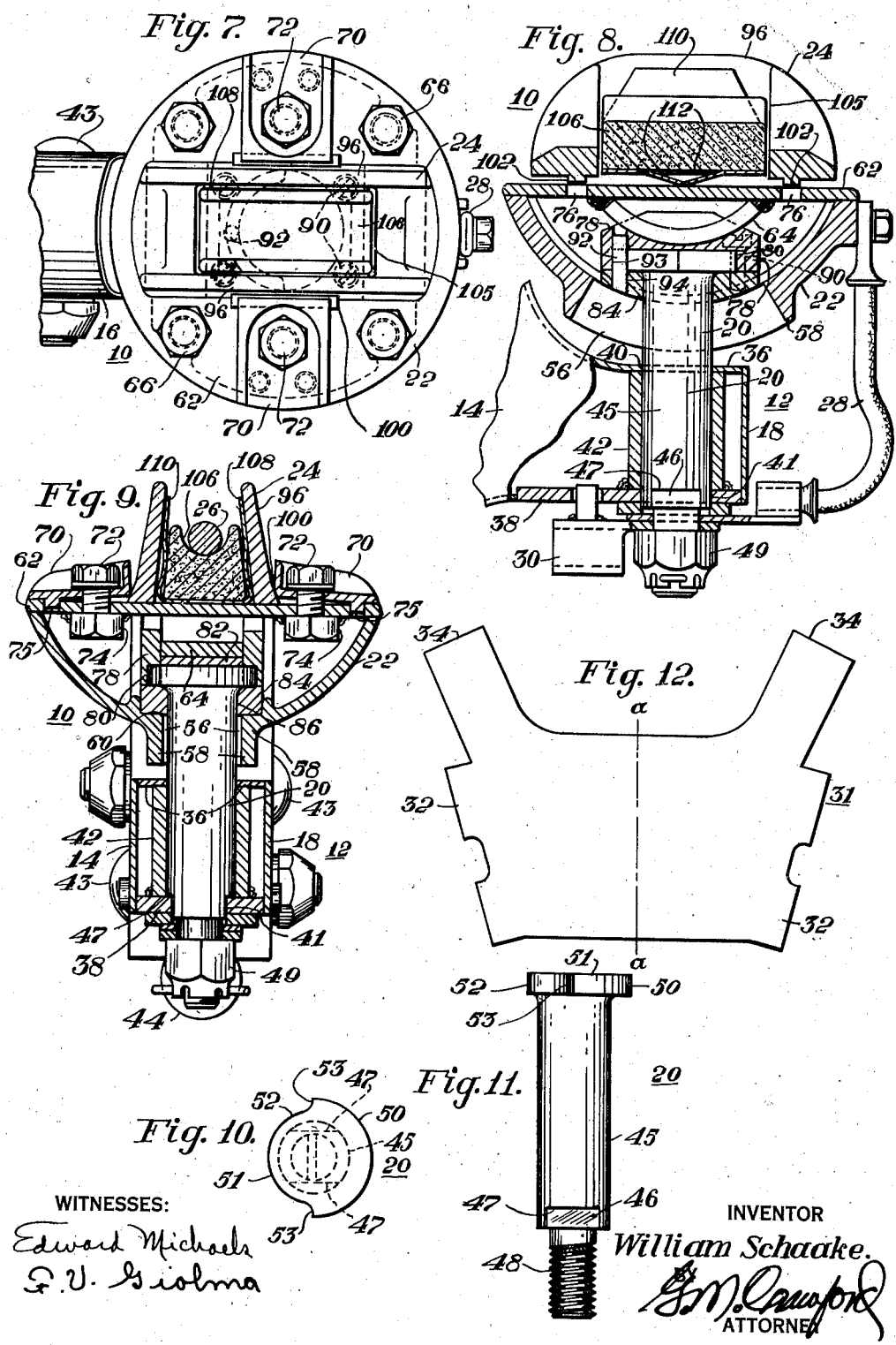
WITNESSES:
Edward Michaels
G. V. Giolma
INVENTOR
William Schaake.
ATTORNEY Patented Nov. 11, 1941

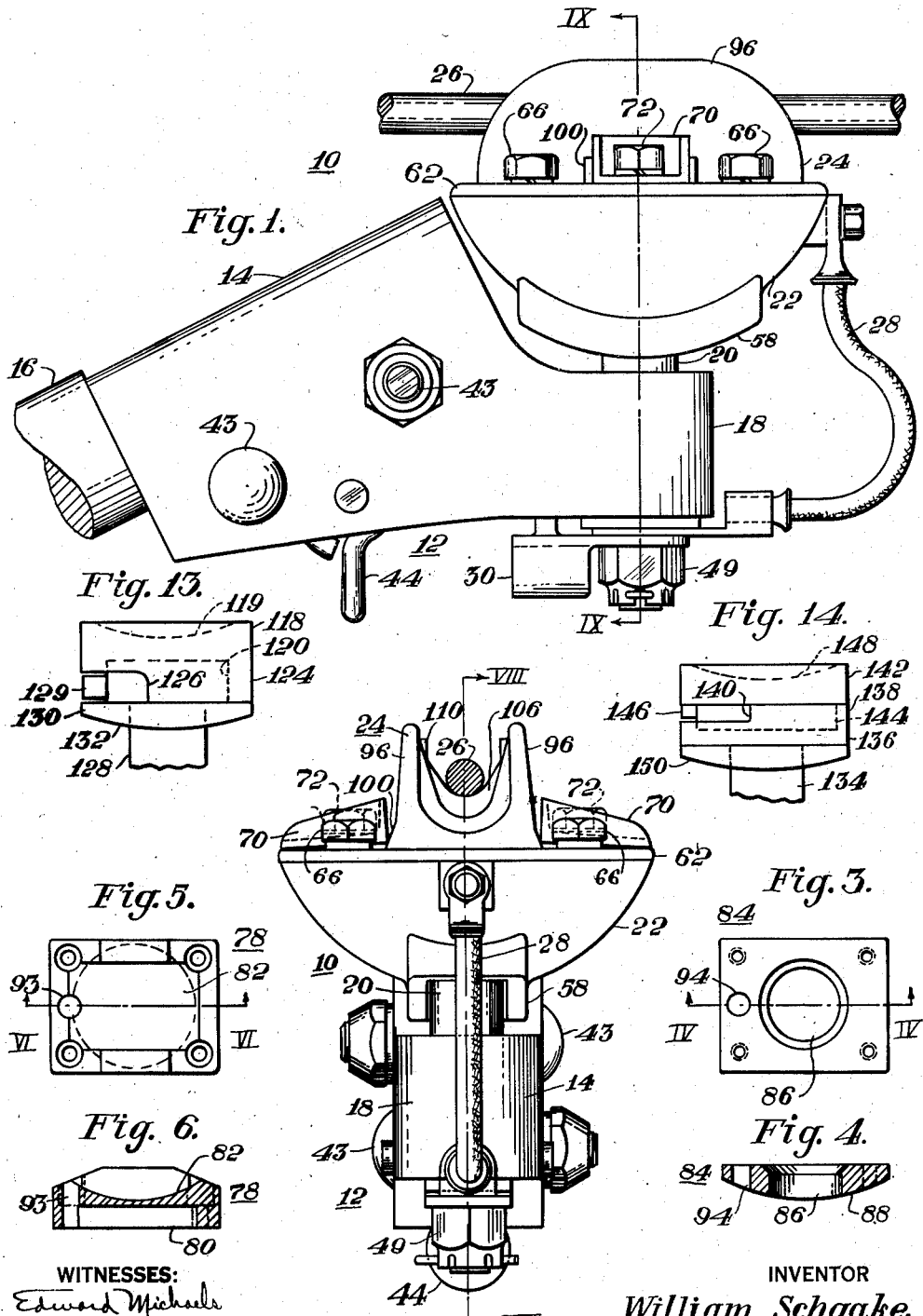

2,262,374

UNITED STATES PATENT OFFICE 2,262,374

CURRENT COLLECTOR

William Schaake, Pittsburgh, Pa., assignor to Westinghouse Electric & Manufacturing Company, East Pittsburgh, Pa., a corporation of Pennsylvania Application January 4, 1939, Serial No. 249,185

8 Claims. (Cl. 191—59.1)

My invention relates, generally, to current collectors, and it has reference, in particular, to a trolley pole head for use with electrically-operated vehicles, such, for example, as trolley busses and the like.

The object of my invention, generally stated, is to provide a trolley pole head of simple and durable construction and which may be economically manufactured and maintained in service.

A more specific object of my invention is to provide for removably securing a current collector shoe to a swivel member of a trolley pole head and mount the swivel member on the body member of the pole head so as to provide for movement of the shoe relative to the body member in a plurality of planes within a limited horizontal angle.

Another object of my invention is to mount a current collector shoe on a support member so as to provide for oscillation of the current collector shoe in a plurality of planes with respect to the support member, without using spherical bearing surfaces.

A further object of my invention is to provide for pivotally mounting a swivel member on the support stem of a trolley pole head, and secure a removable current collector shoe to the swivel member in such manner as to retain a renewable carbon insert member in the collector shoe in operating relation therewith.

A still further object of my invention is to maintain a current collector shoe in operating relation with a trolley pole head support member, on which it is pivotally mounted, by utilizing an arcuate retaining member.

Still another object of my invention is to provide for securing a loosely positioned insert member in operating relation with a removable current collector shoe through the engagement of the current collector shoe with a support member.

Another object of my invention is to provide for securing a loosely positioned carbon insert member in a removable current collector shoe and protecting the sides of the current collector shoe from undue wear.

Other objects will, in part, be obvious, and will, in part, appear hereinafter.

For a complete understanding of the nature and scope of my invention, reference may be had to the following detailed description, taken in connection with the accompanying drawings, in which:

Figure 1 is a side elevation view of a trolley pole head embodying my invention, Fig. 2 is an end elevation view of the trolley pole head shown in Fig. 1, Fig. 3 is a plan view of a swivel retaining member, Fig. 4 is a sectional view taken along the line IV—IV of Fig. 3, Fig. 5 is a plan view of a bearing member which is interposed between the swivel member and the support stem, Fig. 6 is a sectional view taken along the line VI—VI of Fig. 5, Fig. 7 is a plan view of the trolley pole head shown in Figs. 1 and 2, Fig. 8 is a sectional view taken along the line VIII—VIII of Fig. 2, with the collector shoe raised slightly from the swivel member, showing in detail the construction of the pole head and shoe, Fig. 9 is a sectional view taken along the line IX—IX of Fig. 1, Fig. 10 is a plan view of the support stem on which the swivel member is mounted, Fig. 11 is a side elevational view of the support stem, Fig. 12 is a reduced plan view of one form of punching from which the body member of the pole head may be formed, Fig. 13 is an elevational view of an alternate form of support stem and intermediate bearing member construction, and Fig. 14 illustrates a further modification of a support stem and intermediate bearing member construction.

Referring particularly to Figs. 1 and 2 of the drawings, the reference numeral 10 denotes generally a trolley pole head comprising a body member 12 which is provided with a socket portion 14, for supporting the body member on a trolley pole or a trolley pole extension 16, and a support extension 18 to which a support stem 20 may be secured. A swivel member 22 is mounted on the support stem 20 so as to be movable relative thereto in a plurality of planes within a limited vertical angle for supporting a current collector shoe 24 which is disposed to engage a trolley wire 26. A suitable shunt member 28 may be provided for connecting the swivel member 22 to a terminal connection 30 on the body member of the pole head, for making electrical connection with the collector shoe 24.

The details of the construction of the body member 12 of the pole head may be clearly understood by referring particularly to Figs. 1, 8 and 12 of the drawings. As there illustrated, the body member 12 is preferably of a fabricated construction, formed, for example, by performing suitable bending and welding operations on a sheet metal punching 31 of substantially the shape shown in Fig. 12. For example, the punching 31 may be bent about the axis a—a to provide a substantially U-shaped channel of which the lip portions 32 may be bent inwardly and joined together in any suitable manner, such as, for example, by welding, so as to provide the socket portion 14. The projections 34 of the punching 31 may be bent inwardly at the ends and welded together to form the support extension 18. Suitable strips of sheet metal 36 and 38 may be secured to the top and bottom of the support extension 18, preferably by welding, and aligned openings 40 and 41, respectively, provided therein for receiving the support stem 20. A bushing 42 may be interposed between the strips 36 and 38 and welded thereto for reenforcing the support extension and facilitating the securing of the stem 20 therein. Means such as the bolts 43 may be provided for securing the trolley pole extension 16 in the socket portion 14 of the body member, and a suitable hook member 44 may be provided for attaching a trolley pole cable or rope to the pole head.

Figs. 10 and 11 of the drawings show the details of construction of the support stem 20, which may comprise an elongated body portion 45 having a flattened section 46 with shoulder portions 47 adjacent to the lower end, corresponding to the flattened sides of the opening 41 of the support extension 18. The shoulder portions 47 are disposed to provide a suitable seating surface for the stem and the flattened section 46 prevents rotation of the stem 20 relative to the body member of the pole head. A threaded portion 48 is provided at the end of the stem for receiving a nut 49 for rigidly securing the stem in the support extension 18.

The upper end of the support stem 20 may comprise a flanged head 50 having a substantially flat bearing surface 51 on the top thereof. A portion of the periphery of the flanged head 50 may be cut away on the front side to provide a peripheral edge 52 of reduced radius, terminating in shoulder portions 53 at each side thereof, which serve a purpose which will hereinafter be explained in detail.

The swivel member 22, which is disposed to be supported by the support stem 20 so as to be movable relative thereto in a plurality of planes, is preferably cup-shaped, as shown most clearly in Figs. 7, 8 and 9, having an elongated opening 56 in the bottom thereof, through which the support stem 20 projects so as to permit a rocking movement of the swivel 22 with respect to the stem about a horizontal axis transverse to the longitudinal axis of the collector shoe 24. Depending lip portions 58 along the sides of the opening 56 are provided for preventing rocking movement of the swivel member 22 relative to the stem 20 about a horizontal axis which is parallel to the longitudinal axis of the shoe. Interior arcuate bearing surfaces 60 are provided adjacent to and along the sides of the opening 56.

A cover plate 62, having an arcuate bearing surface 64 on the underside thereof, of such a radius of curvature as to have the same center of oscillation as the interior arcuate bearing surfaces 60 of the swivel member, is disposed to be secured to the top of the swivel member by suitable means such as the bolts 66. Means, such as, for example, the L-shaped clamp members 70 may be positioned on the cover plate 62, at each side thereof, for engaging the sides of the collector shoe 24 and removably securing it to the swivel member 22. The clamp members 70, may, for example, be secured by bolts 72 which are threaded into nuts 74, welded to the lower side of the cover plate 62. Projections 75 may be provided on the lower side of the members 70 for positioning in suitable openings in the cover plate 62, so as to provide a fulcrum for obtaining a hinge action when the bolts 72 are tightened to wedge the clamp members 70 against the shoe 24. Suitable openings 76 may be provided in the cover plate 62 for ensuring the correct alignment of the shoe 24 when it is positioned thereon.

In order to mount the swivel member 22 on the support stem 20 so that it may oscillate in a plurality of planes relative to the body member 12, without utilizing spherical bearing surfaces, an intermediate bearing member 78 may be provided. Referring particularly to Figs. 5, 6, 8 and 9, it may be seen that according to a preferred construction the intermediate bearing member 78 which is disposed to be positioned on the stem 20, is provided with a cupped bearing recess 80 on the lower side thereof for receiving the flanged head 50 of the support stem 20 so that the intermediate bearing member may be rotatably supported on the bearing surface 51 of the support stem, and an arcuate bearing groove 82 on the upper side for engagement with the arcuate bearing surface 64 of the swivel member cover plate 62 for effecting oscillation of the swivel member 22 upon the intermediate bearing member.

A retaining member 84 may be provided for maintaining the swivel member on which the current collector shoe is mounted in operating relation with the support stem, comprising, for example, as illustrated in Figs. 3, 4, 8 and 9, a washer with a central opening 86 for receiving the body member 45 of the support stem 20, a flat bearing surface on the upper side for engaging the under surface of the flanged head 51 of the support stem, and an arcuate bearing surface 88 on the lower side for engaging the interior bearing surfaces 60 of the swivel member.

It has been found desirable, in order to facilitate the positioning of the current collector shoe 24 in engagement with the trolley wire 26, to limit the degree of rotation of the current collector shoe 24 about a vertical axis. I prefer to attain this result by limiting the amount of rotation of the intermediate bearing member 78 relative to the stem 20. To this end, the intermediate bearing member 78 and the retaining member 84 may be secured together, after they have been placed in position on the head 50 of the support stem 20, by means such as the screws 90, and suitable means such as the stop pin 92 positioned in aligned openings 93 and 94 in the intermediate bearing member 78 and the retaining member 84, respectively, so as to move in the cutaway periphery portion 52 of the flanged head and engage the shoulder portions 53 thereof when the intermediate bearing member and retaining member have rotated through the desirable horizontal angle on either side of a central position. The swivel member 22, being supported by the intermediate bearing member 78, is thus also limited in its degree of rotation about a vertical axis.

Referring particularly to Figs. 2, 8 and 9 of the drawings, it may be seen that the current collector shoe 24 comprises, generally, an elongated body member having upstanding side lips 96 which define a groove for receiving the trolley wire 26. The outer sides of the shoe 24 may be provided with outwardly sloping portions 100 adjacent to the base adapted to be engaged by the clamp members 70 for effecting a wedging action therewith to facilitate positioning of the shoe on the swivel member. Suitable means, such as the projections 102 may be provided on the lower side of the shoe 24 for positioning in the openings 76 of the swivel cover plate 62 to ensure the correct alignment of the shoe with respect to the swivel.

In order to facilitate positioning an insert member in the collector shoe so that it may be readily renewed, a centrally disposed opening 105 is provided through the body member of the shoe 24. This opening is, preferably, slightly smaller on the groove or upper side of the shoe than on the lower side, the side walls of the opening, for example, being slightly tapered, so that a removable insert 106, the sides of which are preferably tapered also, may be positioned therein from the lower side. The insert 106 is preferably of a carbonaceous material, so as to not only lubricate the trolley wire and reduce the wear on both the current collector shoe and the wire, but also provide a renewable non-sparking collector shoe contact surface, a feature which is highly desirable where alloy shoes of aluminum or bronze are used. In order to facilitate the positioning of the removable insert member 106 in the opening 105 of the shoe and ensure a proper fit therein, a retaining clip 108 may be provided, comprising, for example, as shown particularly in Figs. 8 and 9, a channel shaped member of resilient material, such as phosphor bronze sheet, for taking up any clearance between the insert and the shoe. The retaining clip 108 is preferably positioned about the insert member 106 so that the upstanding sides 110 thereof are disposed between the insert member 106 and the side walls of the opening 105 in the collector shoe 24 and project above the sides of the insert member 106. The sides 110 of the retaining clip 108 may be suitably deformed or slightly dished, as shown, so as to effectively take up any side play between the insert 106 and the side walls of the opening 105, so that the insert may be properly positioned therein. The projecting sides 110 may also be utilized for protecting the upstanding sides 96 of the collector shoe from side wear. This increases greatly the life of the shoe, particularly where collector shoes of a relatively soft aluminum alloy or bronze are used.

It has further been found desirable to impart a resiliency to the bottom of the retaining clip 108 by, for example, providing deformed tongue portions 112 in the bottom thereof. Thus, when the insert 106 is positioned in the current collector shoe 24 with the retaining clip 108 in position about it, and the current collector shoe is then secured to the cover plate 62 by adjustment of the clamping members 70, the resilient tongues 112 of the retaining clip 108 will press against the cover plate 62 and urge the insert member 106 upwardly, thus ensuring a positive electrical connection between the insert member 106 and the shoe 24, regardless of manufacturing variations in the dimension of these members.

In assembling the pole head, the arcuate retaining member 84 is first positioned on the support stem 20 with the arcuate surface 88 downward, and the intermediate bearing member 78 is positioned on top of the flanged head 50. These members may then be secured together by means of screws 90, and the stop pin 92 inserted in the aligned openings 93 and 94, thereof. The stem is then inserted through the opening 56 of the swivel 22, so that the bearing surface 88 of the arcuate retaining member engages the interior arcuate bearing surfaces 60 of the swivel. The support stem 20 is positioned in the support extension 18 of the body member 12 and secured therein by means of the nut 49. The cover plate 62 may then be secured to the swivel 22 by means of the bolts 66, with the arcuate bearing surface 64 positioned in the arcuate bearing groove 82 of the intermediate bearing member 78. The swivel member 22 is then free to rock in the arcuate bearing groove 82 of the intermediate bearing member 78 and rotate with the intermediate bearing member about the axis of the support stem 20 within a limited horizontal angle.

The insert member 106 may then be loosely positioned in the opening 105 of the collector shoe 24 and the retaining clip 108 positioned thereabout. By placing the collector shoe 24 on the cover plate 62 with the projections 102 in the openings 76 of the cover plate 62, and tightening the bolts 72, the collector shoe 24 and the removable insert 106 may be secured in operating relation on the swivel 22, which is free to move about a plurality of horizontal axes, within a limited horizontal angle.

An alternate form of construction for supporting the swivel member 22 is illustrated in Fig. 13, the intermediate bearing member 118, having an arcuate bearing groove 119 on the upper side thereof, and a cupped recess 120 on the lower side with the depending edge 124 thereof cut away to provide shoulders 126 is disposed to be rotatably positioned on the head of a stem 128. Means, such as the pin 129 which projects from the stem 128, is provided for engaging the shoulders 126 so as to limit the degree of rotation of the intermediate bearing member with the axis of the stem. A washer 130, having an arcuate lower bearing surface 132 is utilized for retaining a swivel member in operating relation with the stem 128 in substantially the same manner as hereinbefore described in connection with the preferred embodiment of the invention.

A further modification of the intermediate bearing member and support stem construction is illustrated in Fig. 14, where the reference numeral 134 denotes a support stem having a cupped bearing member 136 at its upper end with the upstanding sides 138 thereof cut away to provide shoulder portions 140 at each side. The intermediate bearing member 142 has a substantially cylindrical boss 144 on the lower side, which is disposed to fit in the cupped member 136 of the stem for rotation therein. A stop, comprising for example a projecting lug or stop pin 146, is provided for engaging the shoulder portions 140 of the cupped bearing recess 136, thus limiting the degree of rotation of the bearing member 142 relative to the stem.

An arcuate groove 148 is provided on the upper side of the bearing member, for engaging the arcuate bearing surface of a swivel cover plate, in substantially the same manner as shown in Fig. 8 of the drawings. The rotatable arcuate retaining washer 150 is disposed to be positioned on the support stem 134 for retaining a swivel 22 in operating relation with the support stem as hereinbefore described in connection with the preferred embodiment of the invention.

From the above detailed description and the accompanying drawings, it may be understood that in my invention I have provided a trolley pole head having a current collector shoe on the body member thereof for universal movement, without necessitating the use of spherical bearing surfaces, and have made provision in a simple and effective manner for limiting the rotation of the current collector shoe about a vertical axis, so that the current collector shoe may readily be positioned on an overhead trolley wire. By securing the collector shoe to a swivel, and at the same time retaining a removable insert member in the removable current collector shoe, in the manner therein described and illustrated, I have greatly simplified the construction of the swivel and collector shoe, and have facilitated removal of the current collector shoe and/or the insert member, thereby reducing maintenance costs. By utilizing a retaining clip which also protects the current collector shoe against undue side wear, I have provided for increasing the life of the shoe and have additionally reduced the cost of maintenance of the pole head.

Since certain changes may be made in the above construction, and different embodiments of the invention may be made without departing from the spirit thereof, it is intended that all the matter contained in the above description or shown in the accompanying drawings, shall be considered as illustrative, and not in a limiting sense.

I claim as my invention:

1. A trolley pole head comprising, a body member, a swivel member supported by the body member in pivotal relation thereto, a current collector shoe having a removable insert member loosely positioned in a recess therein from the lower side mounted on the swivel member for engaging a trolley conductor, and means associated with the swivel member for securing the insert member in fixed relation to the shoe by engaging the collector shoe to secure the swivel member and the collector shoe in operating relation and urge the insert member into the recess in operating relation with the collector shoe.

2. A pole head for an electric vehicle comprising, a body member, a fixed support stem supported thereby, an intermediate bearing member rotatably associated with the support stem, a swivel member disposed in oscillative relation with the intermediate member, a current collector shoe having a removable insert member positioned on the swivel member for engaging a trolley wire, and means for securing the collector shoe and insert member in fixed relation with the swivel member and each other.

3. A current collecting device comprising, a body member having a support engaging socket, a support stem secured to the body member in a substantially vertical position, a bearing member rotatably disposed upon the support stem for limited rotation about a substantially vertical axis and provided with an arcuate bearing surface on the upper side, a swivel member having an arcuate bearing surface engaging the arcuate bearing surface of the bearing member, an arcuate retaining member secured to the lower side of the bearing member for maintaining the swivel member in operating relation with the support stem member, and a current collector shoe removably secured to the swivel member.

4. A collector shoe comprising, a longitudinally grooved body member having an opening therethrough, an insert member positioned in the opening, and resilient retaining means having upstanding side portions interposed between the insert member and the side walls of the body member and a central portion on the lower side of the insert member deformed to provide biasing means for positioning the insert member in the collector shoe.

5. A current collector shoe comprising, a longitudinally grooved body member of a relatively soft metal having an opening therethrough from the lower side, a carbon insert member loosely positioned in the opening to provide a conductor engaging surface in the groove, and means comprising a resilient member disposed about the insert member to position the insert in the opening and provide a renewable wear surface for protecting the side walls of the groove from wear.

6. The combination, in a current collecting device, of a support member comprising a body member removably secured to the support member having an opening therethrough from the lower side, and a renewable insert member freely positioned in the opening from the lower side, a retaining member associated therewith having a resilient portion on at least the lower side, said insert member being secured in fixed relation to the body member by means of the said resilient portion engaging the support member and the insert member.

7. A current collector comprising, a swivel member having an upper surface portion mounted on a support for universal movement, a current collector shoe disposed to be positioned on the swivel member having a body member with a longitudinal groove on the upper side and an opening therethrough from the lower side, said opening being larger on the lower side than on the upper side, an insert positionable in the opening from the lower side, and means including an adjustable clamp member secured to the swivel member operable to effect clamping engagement with the shoe member to so clamp it to the swivel member that the upper surface portion thereof urges the insert member upwardly into the opening into fixed relation with the body member.

8. A current collector comprising, a swivel member having an upper surface portion mounted on a support for universal movement, a slider shoe having a body portion with a tapered opening therethrough from the lower side, a removable insert loosely positioned in the opening from the lower side, and projecting side portions adjacent the lower side of said body portion, and means including an adjustable clamp member secured to the swivel member adjustable to engage the projecting side portions and so clamp the shoe against the swivel member that the said upper surface portion of the swivel member urges the insert upwardly into the opening so as to secure the insert in fixed relation in the opening.

WILLIAM SCHAAKE.